(12) United States Patent
Matsumoto

(10) Patent No.: US 12,316,498 B2
(45) Date of Patent: May 27, 2025

(54) COMMUNICATION APPARATUS COMMUNICABLE WITH INFORMATION PROCESSING APPARATUS, CONTROL METHOD FOR COMMUNICATION APPARATUS, STORAGE MEDIUM, AND SYSTEM

(71) Applicant: CANON KABUSHIKI KAISHA, Tokyo (JP)

(72) Inventor: Yu Matsumoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/381,270

(22) Filed: Oct. 18, 2023

(65) Prior Publication Data
US 2024/0137275 A1 Apr. 25, 2024
US 2024/0235938 A9 Jul. 11, 2024

(30) Foreign Application Priority Data
Oct. 24, 2022 (JP) .................. 2022-169993

(51) Int. Cl.
*H04L 41/0806* (2022.01)
*H04L 41/084* (2022.01)

(52) U.S. Cl.
CPC ...... *H04L 41/0846* (2013.01); *H04L 41/0806* (2013.01)

(58) Field of Classification Search
CPC .................. H04L 41/0846; H04L 41/0806
USPC ........................................ 709/224
See application file for complete search history.

(56) References Cited

U.S. PATENT DOCUMENTS

| | | | |
|---|---|---|---|
| 10,560,343 B1* | 2/2020 | Cartsonis | H04L 12/1886 |
| 10,776,056 B2* | 9/2020 | Kato | G06F 3/1291 |
| 11,088,916 B1* | 8/2021 | Chandrashekhar | G06F 11/3409 |
| 11,516,067 B1* | 11/2022 | Marshall | H04L 43/04 |
| 2016/0294624 A1* | 10/2016 | Xia | H04W 4/16 |
| 2016/0337182 A1* | 11/2016 | Shen | G16H 40/20 |
| 2018/0227445 A1* | 8/2018 | Minegishi | G06F 3/1231 |
| 2020/0341698 A1* | 10/2020 | Masuda | G06F 3/1288 |
| 2021/0037160 A1* | 2/2021 | Watanabe | H04N 1/00909 |
| 2021/0126824 A1* | 4/2021 | Li | H04L 41/40 |
| 2021/0271433 A1* | 9/2021 | Hirai | G06F 3/1236 |
| 2021/0306924 A1* | 9/2021 | Nishida | H04W 4/80 |
| 2021/0344562 A1* | 11/2021 | Wackerly | H04L 41/0846 |
| 2021/0377724 A1* | 12/2021 | Kawaura | H04W 76/11 |
| 2021/0392483 A1* | 12/2021 | Otaka | G06F 3/1204 |

(Continued)

FOREIGN PATENT DOCUMENTS

JP 2015-119313 A 6/2015

*Primary Examiner* — Karen C Tang
(74) *Attorney, Agent, or Firm* — VENABLE LLP

(57) ABSTRACT

A communication apparatus receives instruction information from an information processing apparatus. In a case where the instruction information is received, the communication apparatus establishes without an external access point a connection for direct communication to another communication apparatus different from the communication apparatus, and uses the direct communication to send, to the another communication apparatus, the setting information relating to communication with the information processing apparatus. The setting information includes an SSID (Service Set Identifier) that is used for connecting to an external access point.

19 Claims, 15 Drawing Sheets

(56) References Cited

U.S. PATENT DOCUMENTS

| | | | | |
|---|---|---|---|---|
| 2021/0392604 A1* | 12/2021 | Deshmukh | .............. | H04L 12/66 |
| 2022/0217057 A1* | 7/2022 | Schumaker | ............. | H04L 41/20 |
| 2022/0353678 A1* | 11/2022 | Miyake | ................. | H04W 12/69 |
| 2023/0136943 A1* | 5/2023 | Pingale | ................... | H04L 41/12 |
| | | | | 709/222 |
| 2023/0308346 A1* | 9/2023 | Bihannic | ............... | H04L 41/046 |

* cited by examiner

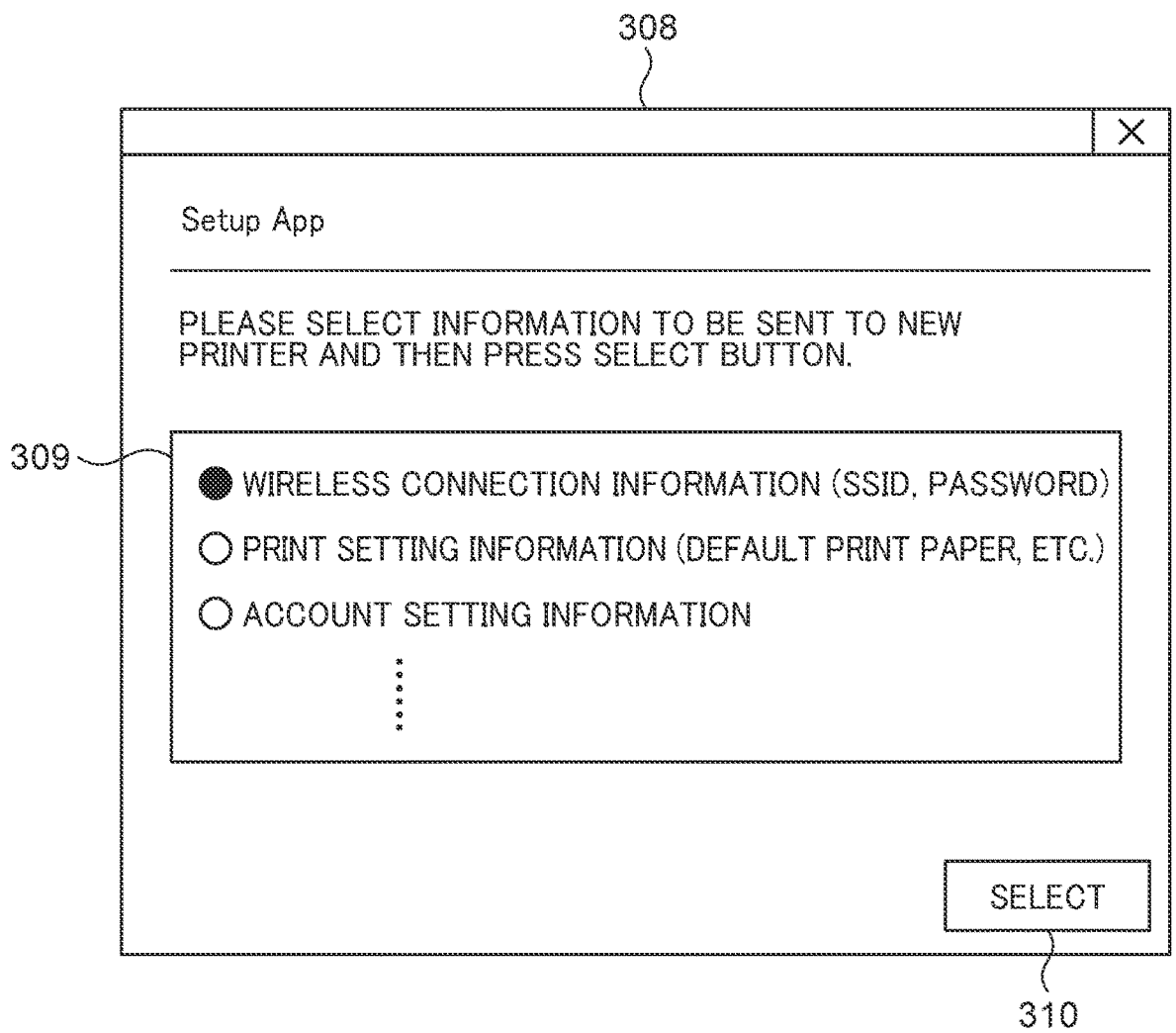

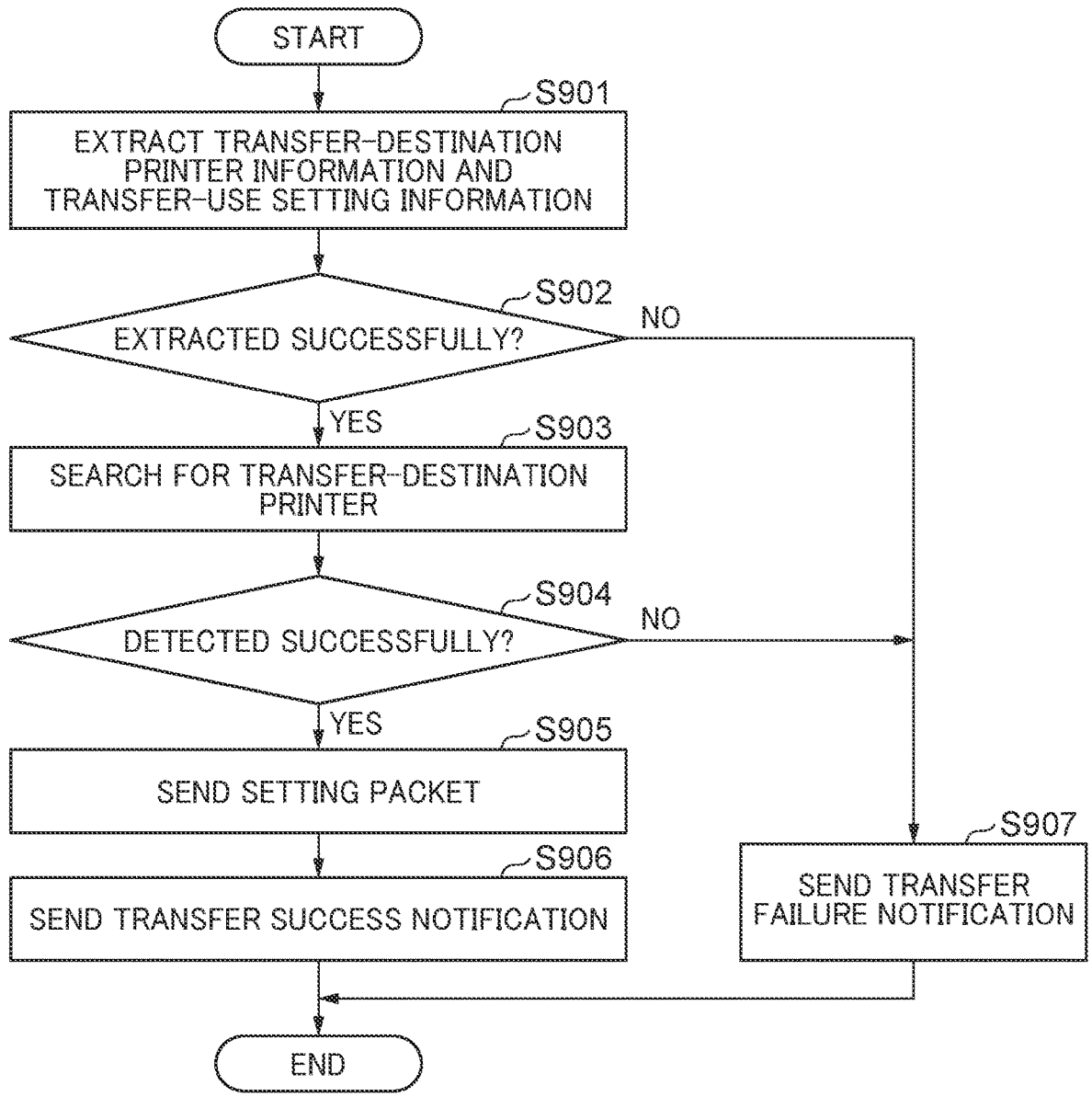

COMMUNICATION APPARATUS COMMUNICABLE WITH INFORMATION PROCESSING APPARATUS, CONTROL METHOD FOR COMMUNICATION APPARATUS, STORAGE MEDIUM, AND SYSTEM

BACKGROUND OF THE INVENTION

Field of the Invention

The present invention relates to communication apparatuses, control methods for the communication apparatuses, storage media, and systems.

Description of the Related Art

Methods for replacing an existing wireless communication apparatus in a system with a new wireless communication apparatus are known, in which setting information about wireless communication set in the existing wireless communication apparatus is transferred to the new wireless communication apparatus. A technique related to the methods is proposed in Japanese Laid-Open Patent Publication (Kokai) No. 2015-119313. According to the proposed technique, when an information processing apparatus wirelessly connects to a new wireless communication apparatus and accesses any desired web page, a display unit of the information processing apparatus is caused to display a guidance screen. By a user performing a predetermined operation on the information processing apparatus according to the guidance screen, setting information about wireless communication set in an existing wireless communication apparatus is copied to the new wireless communication apparatus.

However, according to the technique proposed in Japanese Laid-Open Patent Publication (Kokai) No. 2015-119313 described above, there may be cases where setting information about wireless communication set in an existing wireless communication apparatus fails to be transferred to a new wireless communication apparatus.

SUMMARY OF THE INVENTION

The present invention relates to communication apparatuses, control methods for the communication apparatus, storage media, and systems, which achieve transfer of setting information set in an existing communication apparatus to a new communication apparatus.

According to an aspect of the invention, a communication apparatus communicable with an information processing apparatus, includes a memory storing instructions; and at least one processor. The at least one processor executes the instructions to send setting information to another communication apparatus different from the communication apparatus, based on instruction information received from the information processing apparatus and indicating that the setting information is to be sent to the another communication apparatus, wherein the setting information relates to communication between the information processing apparatus and the another communication apparatus.

According to another aspect of the invention, a control method for a communication apparatus communicable with an information processing apparatus, includes sending setting information from the communication apparatus to another communication apparatus different from the communication apparatus, wherein the setting information relates to communication between the information processing apparatus and the another communication apparatus.

According to another aspect of the invention, a system includes an information processing apparatus, a first communication apparatus communicable with the information processing apparatus, and a second communication apparatus different from the first communication apparatus. The information processing apparatus is configured to send instruction information to the first communication apparatus, wherein the instruction information indicates that setting information relating to communication between the information processing apparatus and the second communication apparatus is to be sent to the second communication apparatus. Based on the instruction information, the first communication apparatus is configured to send the setting information to the second communication apparatus.

According to the present invention, setting information set in an existing communication apparatus can be transferred to a new communication apparatus.

Further features of the present invention will become apparent from the following description of exemplary embodiments with reference to the attached drawings.

BRIEF DESCRIPTION OF THE DRAWINGS

FIGS. 3A to 3G are views illustrating examples of screens that are displayed on a display unit in FIG. 2.

FIG. 9 is a flowchart illustrating the procedure of a second setting process that is carried out by the printer in the second embodiment.

DESCRIPTION OF THE EMBODIMENTS

A detailed description will now be given of preferred embodiments of the present invention with reference to the accompanying drawings. It should be noted that the embodiments described below do not limit the present invention defined by the scope of the claims, and all of the combinations of features of the embodiments described below are not necessarily essential to the means for solving the problems of the present invention.

First, a description will be given of a communication system according to a first embodiment.

Figure 1:
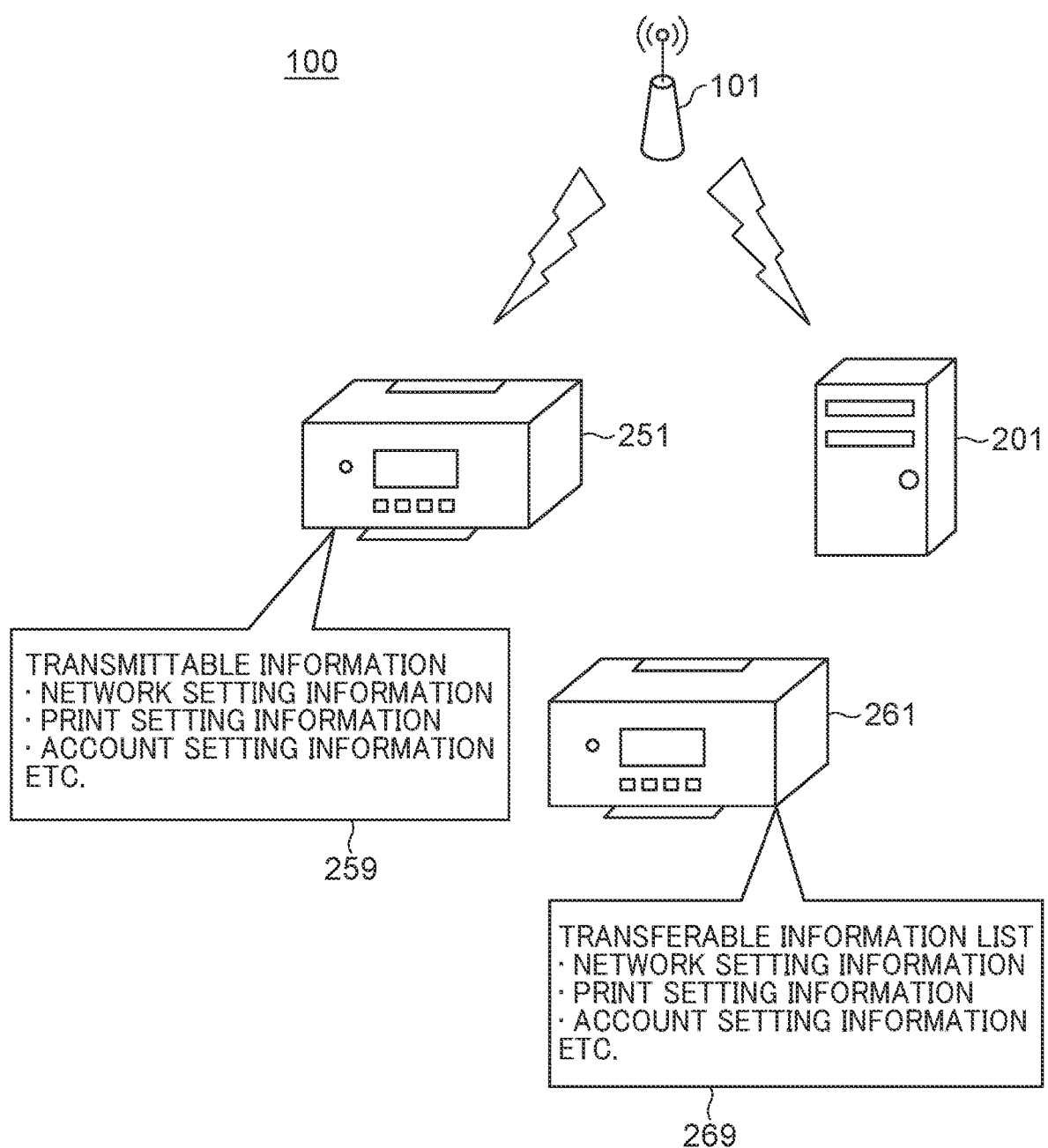
FIG. 1 is a view illustrating an example of the configuration of a communication system according to a first embodiment.

FIG. 1 is a view illustrating an example of the configuration of a communication system 100 according to the present embodiment. Referring to FIG. 1, the communication system 100 includes a PC 201 as an information processing apparatus, a printer 251 as a wireless communication apparatus, and a printer 261 as another wireless communication apparatus.

It should be noted that although in the description of the present embodiment, a PC is taken as an example of an information processing apparatus, the information processing apparatus is not limited to a PC. The information processing apparatus may be a communication apparatus like a mobile terminal, a smartphone, a tablet terminal, a PDA (Personal Digital Assistant), or a digital camera. Although in the description of the present embodiment, a printer is taken as an example of a wireless communication apparatus, the wireless communication apparatus is not limited to a printer, and may be another apparatus capable of wirelessly communicating with a PC. Examples of such an apparatus include a copying machine, a facsimile machine, a mobile terminal, a smartphone, a PC, a tablet terminal, a PDA, a digital camera, a music playback device, and a television.

The PC 201 is connectable to an access point 101 via a wired LAN or a wireless LAN. A LAN (Local Area Network) means a local network that connects devices together in a room or a building. A wired LAN is a type of LAN that uses a communication cable as a signal transmission medium. A wireless LAN is another type of LAN that uses radio waves for carrying out wireless communications as a signal transmission medium, e.g., Wi-Fi. The access point 101 is a device capable of relaying data communications between devices (for example, a PC and a printer) and is a wireless LAN router, a wireless relay device, or the like.

Examples of the printer 251 and the printer 261 include inkjet printers, full-color laser beam printers, and monochrome printers. The printer 251 and the printer 261 may be multifunction peripherals equipped with a plurality of functions such as a copying function, a facsimile function, a printing function, and a scanning function.

FIG. 1 illustrates a state where the printer 261 is not connected anywhere, and the printer 251 is connected to the access point 101 via a wireless LAN. In other words, the PC 201 is communicable with the printer 251 via the access point 101 but is not communicable with the printer 261. The way in which a plurality of devices is connected together via an access point as described above is generally referred to as infrastructure connection.

Establishing the infrastructure connection in the communication system 100 enables the printer 251 and the PC 201 to communicate with devices belonging to a network formed by means of the access point 101. If the access point 101 is connected to the Internet, the printer 251 and the PC 201 are allowed to access the Internet via the access point 101.

The printer 251 stores transmittable information 259. The transmittable information 259 is setting information that the printer 251 is allowed to transmit to other devices, such as the printer 261, and includes, for example, network setting information, print setting information, and account setting information.

The network setting information is information used for wireless communication with the PC 201. For example, the network setting information is connection information for connecting to the access point 101 that is used when the printer 251 wirelessly connects to the PC 201, such as an SSID (Service Set Identifier) and a password. The print setting information and the account setting information are setting information that is used in a printing process by the printer 251. Examples of the print setting information include setting information indicating the types of sheets that can be used for the printer 251 and setting information indicating margins used for printing. Examples of the account setting information include a user name and a password used for accessing a service that performs printing over the Internet, such as a cloud printing service.

The printer 261 stores a transferrable information list 269. The transferrable information list 269 is a list of information transferrable from other communication apparatuses, such as setting information supported by the printer 261, in other words, a list of setting information that can be set for the printer 261.

The PC 201 is configured to send a network setting instruction (instruction information indicating that setting information relating to communication between the PC 201 and the printer 261 is to be sent to the printer 261) according to an instruction entered by a user. Upon receiving the network setting instruction from the PC 201, the printer 251 is configured to send setting information, which relates to communication between the PC 201 and the printer 261 (e.g., the network setting information) to the printer 261, which is a data transfer destination. The printer 261 is configured to wirelessly connect to the access point 101 using the network setting information received from the printer 251. The printer 251 is further configured to also send other setting information (non-network setting information), which is different from the network setting information, to the printer 261, which is the data transfer destination. The other setting information is setting information that is supported by the printer 261, which is the data transfer destination, and examples of the other setting information includes print setting information (setting information for use in a printing process) and account setting information.

It should be noted that although in the description of the present embodiment, the printer 251 is configured to send the network setting information and the other setting information to the printer 261, the printer 251 may be configured to send only the network setting information.

In the present embodiment, on the assumption that the printer 251 as an existing wireless communication apparatus is replaced with the printer 261 as a new wireless communication apparatus in the communication system 100, the network setting information in the printer 251 is transferred to the printer 261. In the communication system 100, this process is implemented by the PC 201, the printer 251, and the printer 261 working in cooperation with one another.

In the communication system 100, there may be cases where setting information relating to wireless communication may fail to be transferred to the printer 261 as the new wireless communication device. For example, in the communication system 100 configured such that the printer 261 as the new wireless communication apparatus and the printer 251 as the existing wireless communication apparatus wirelessly communicate with the PC 201 as the information processing apparatus via respective access points, the PC 201 may fail to wirelessly connect to the printer 261. Examples of the case where the PC 201 fails to wirelessly connect to the printer 261 include a case where the printer 261 is too far away from the PC 201 to wirelessly communicate with the PC 201, and a case where the PC 201 has no wireless communication function and is connected to an access point by wire. In those cases, the PC 201 does not display a guidance screen indicating an operating procedure for transferring information relating to wireless communication to the printer 261, and hence a user is not able to perform an operation for transferring information relating to wireless communication, which is set in the printer 251, to the printer 261.

Accordingly, in the present embodiment, the printer 251, which is the data transfer source, is configured to perform the following operation. That is, the printer 251 searches for a data transfer destination according to an instruction from the PC 201. The printer 251 then terminates a connection for wireless communication with the PC 201 and establishes a wireless communication with the printer 261, which is the data transfer destination. Furthermore, to the printer 261, the printer 251 sends setting information relating to communication between the PC 201 and the printer 261, and more specifically, the network setting information relating to communication between the PC 201 and the printer 261, among a plurality of pieces of setting information stored in the printer 251. With this configuration, the network setting information is sent to the printer 261 even if the PC 201 is not wirelessly connectable to the printer 261. In other words, this configuration achieves a transfer of the network setting information set in the printer 251, which is the data transfer source, to the printer 261, which is the data transfer destination.

It should be noted that the communication system 100 may be configured such that, according to a user's instruction input to one of the PC 201, the printer 251, and the printer 261, a process of transferring the network setting information in the printer 251 to the printer 261 is carried out. In such a system, there may be a case where the printer 251 and the printer 261 have small display units and/or small operation units, or a case where the printer 251 and the printer 261 have no display units and/or no operation units. In these cases, it is difficult for a user to input an instruction to the printer 251 or the printer 261 to cause the process of transferring the network setting information in the printer 251 to the printer 261 to be carried out.

In view of that, in the present embodiment, the communication system 100 is configured such that, according to a user's instruction input to the PC 201, the process of transferring the network setting information in the printer 251 to the printer 261 is carried out. Alternatively, the communication system 100 may be configured such that, according to a user's instruction input to the printer 251 or the printer 261, the process of transferring the network setting information in the printer 251 to the printer 261 is carried out.

Figure 2:
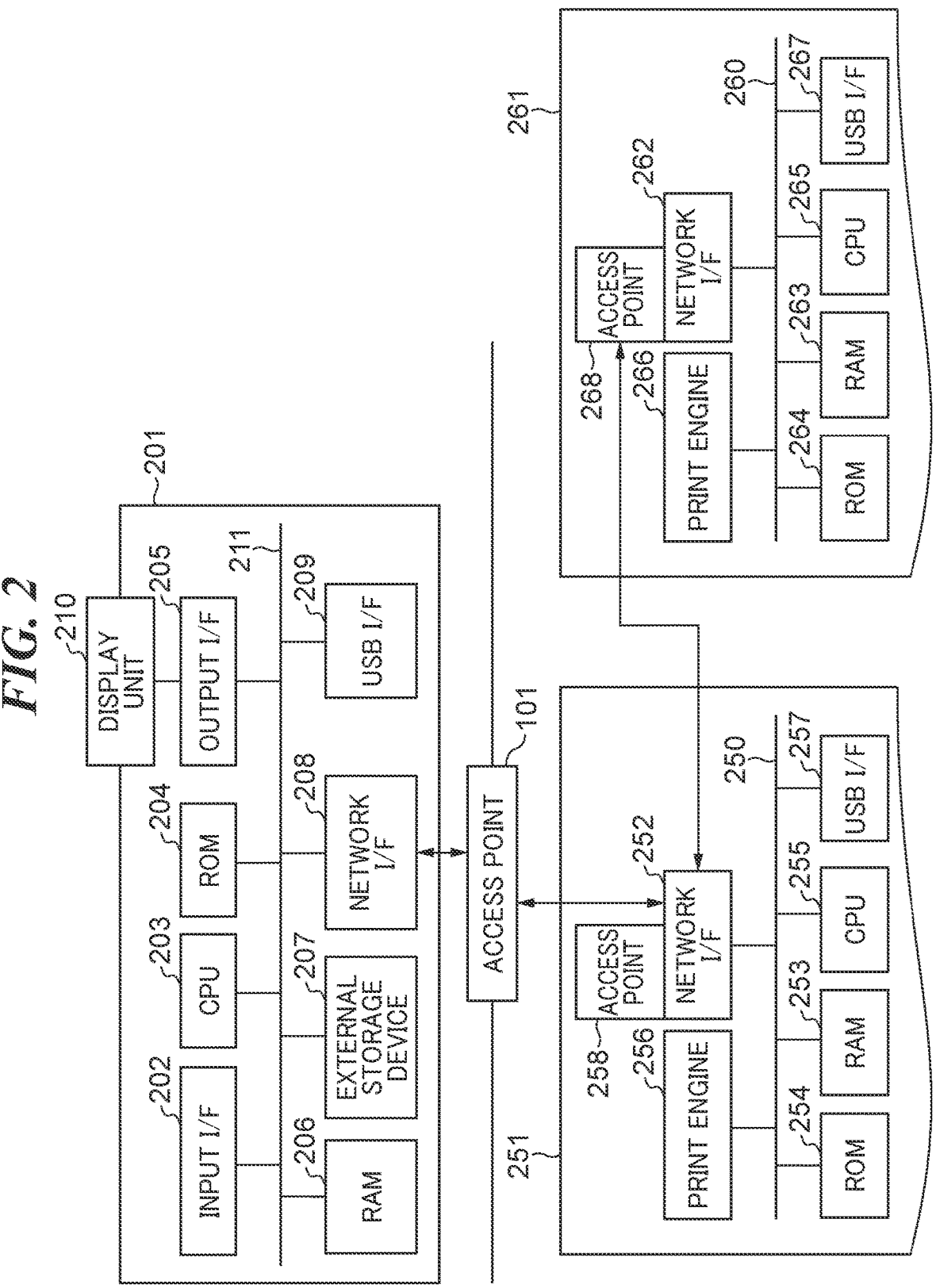
FIG. 2 is a block diagram schematically illustrating hardware configurations of a PC and printers in FIG. 1.

A description will now be given of hardware configurations of the PC 201, the printer 251, and the printer 261. FIG. 2 is a block diagram schematically illustrating the hardware configurations of the PC 201, the printer 251, and the printer 261 in FIG. 1.

Referring to FIG. 2, the PC 201 includes an input OF 202, a CPU 203, a ROM 204, an output OF 205, a RAM 206, an external storage device 207, a network OF 208, a USB OF 209, and a display unit 210. The input OF 202, the CPU 203, the ROM 204, the output OF 205, the RAM 206, the external storage device 207, the network OF 208, and the USB OF 209 are connected to one another via a bus 211. It should be noted that USB is an abbreviation of Universal Serial Bus.

The input OF 202 includes input devices such as a mouse and a keyboard, and this allows the PC 201 to receive various instructions from a user operating the input devices. The CPU 203, which is a system control unit, is a processor that controls the entire PC 201.

The ROM 204 stores fixed data such as control programs, which are executed by the CPU 203, data tables, and embedded operating system (hereafter referred to as "OS") programs. In the present embodiment, the control programs stored in the ROM 204 are configured to control the execution of software such as scheduling, task switching, and interrupt processing under the control of an embedded OS stored in the ROM 204.

The RAM 206 is comprised of an SRAM (Static Random Access Memory) or the like, which requires a backup power supply. The RAM 206 is configured to hold data by means of power supplied from a primary battery for data backup, which is not illustrated, so that the RAM 206 can store important data such as program control variables without volatizing the data. A memory area where setting information on the PC 201, management data on the PC 201, and so forth are stored is also provided in the RAM 206. The RAM 206 is also used as a main memory and a work memory for the CPU 203.

The external storage device 207 stores an application that provides a printing execution function, a print job generation program that generates printer-interpretable print jobs, and so forth. The external storage device 207 also stores various programs including an information-transmission-reception control program that transmits and receives information to and from printers connected via the network OF 208 and the USB OF 209 and various types of information to be used by those programs. The external storage device 207 further stores a setup program, which will be described later.

The output OF 205 is an interface that performs control for the display unit 210 to display data and provide notification of the status of the PC 201. The display unit 210 includes a display device like an LED (light-emitting diode) or an LCD (liquid crystal display), and is configured to display data and provide notification of the status of the PC 201. It should be noted that the display unit 210 may be equipped with an operation unit comprised of numeric value input keys, a mode setting key, an enter key, a cancel key, and a power key on the display device. This allows the PC 201 to receive various instructions from a user via the display unit 210.

The network OF 208 is configured to control communication processes via any of a wireless LAN and a wired LAN. Specifically, the network OF 208 is configured to connect to the access point 101 via a wireless LAN or a wired LAN and carry out data communications. The network OF 208 is also capable of connecting to an access point 258 and an access point 268, which will be described later.

The USB OF 209 is configured to control USB connections via a USB cable. Specifically, the USB OF 209 is configured to connect to a device like a printer or an external access point via a USB and carry out data communications with the connected device.

Referring to FIG. 2, the printer 251 includes a network OF 252, a RAM 253, a ROM 254, a CPU 255, a print engine 256, and a USB OF 257. The network OF 252, the RAM 253, the ROM 254, the CPU 255, the print engine 256, and the USB OF 257 are connected to one another via a bus 250.

The network OF 252 includes the access point 258 for the printer 251 to wirelessly connect to an external device. The network OF 252 is configured to control communication processes via a wireless LAN or a wired LAN cable. It should be noted that although in the present embodiment, the printer 251 is configured to use a wireless LAN for wireless communications, the printer 251 may be alternatively configured to use Bluetooth or the like for wireless communications. The network OF 252 may be equipped with hardware that functions as an access point or may operate as an access point using software for functioning as an access point. The printer 251 may be equipped with a plurality of network I/Fs 252 so as to carry out communications by a plurality of communication methods. For example, the printer 251 may be additionally equipped with interfaces that carry out communications by short-range wireless communication methods such as Bluetooth Low Energy, Near Field Communication, and Wi-Fi Aware.

The RAM 253 is comprised of an SRAM or the like, which requires a backup power supply. It should be noted that the RAM 253 is configured to hold data by means of power supplied from a primary battery for data backup, which is not illustrated, so that the RAM 253 can store important data such as program control variables without volatizing the data. A memory area where setting information on the printer 251, management data on the printer 251, and so forth are stored is also provided in the RAM 253. The RAM 253 is also used as a main memory and a work memory for the CPU 255. For example, the RAM 253 functions as a receive buffer for temporarily storing a print job received from the PC 201 or the like.

The ROM 254 is a memory (storage unit) that stores fixed data such as control programs, which are executed by the CPU 255, data tables, and OS programs. In the present embodiment, the control programs stored in the ROM 254 are configured to control the execution of software such as scheduling, task switching, and interrupt processing under the control of an embedded OS stored in the ROM 254. The CPU 255, which is a system control unit, is a processor that controls the printer 251.

The print engine 256 is configured to carry out an image forming process in which an image is formed on a printing medium like a paper sheet by applying a recording agent like ink onto the printing medium based on information stored in the RAM 253 or on a print job received from the PC 201, and then output printed matter. It should be noted that a print job means job data used for causing a printer to carry out the image forming process.

Referring to FIG. 2, the printer 261 includes a network OF 262, a RAM 263, a ROM 264, a CPU 265, a print engine 266, and a USB OF 267. The network OF 262, the RAM 263, the ROM 264, the CPU 265, the print engine 266, and the USB OF 267 are connected to one another via a bus 260.

It should be noted that the RAM 263, the ROM 264, the CPU 265, the print engine 266, and the USB OF 267 have the same functions and configurations as those of the RAM 253, the ROM 254, the CPU 255, the print engine 256, and the USB OF 257, respectively, of the printer 251.

The network OF 262 includes the access point 268 for the printer 261 to wirelessly connect to an external device. The network OF 262 is configured to control communication processes via a wireless LAN or a wired LAN cable. It should be noted that the network OF 262 may directly carry out wireless communications with the printer 251 or may carry out wireless communications with the printer 251 via the access point 101. That is, the network OF 262 itself may not only operate as the access point 268 but also operate as an extension unit that connects to an external access point.

The present embodiment provides above an example of how the PC 201, the printer 251, and the printer 261 work in cooperation with one another and share the workload, the workload should not always be shared as described above and may be shared in other ways.

A description will now be given of how setting information is transferred to a data transfer destination in the communication system 100. In the present embodiment, on the assumption that the printer 251 as an existing wireless communication apparatus is replaced with the printer 261 as a new wireless communication apparatus, as described above, network setting information in the printer 251 is transferred to the printer 261. Moreover, as described above, the PC 201 is now communicable with the printer 251 via the access point 101 but is not communicable with the printer 261, and it is assumed that a process of transferring the setting information is started in this state.

FIGS. 3A to 3G are views illustrating examples of screens that are displayed on the display unit 210 in FIG. 2. The various screens illustrated in FIGS. 3A to 3G are displayed on the display unit 210 of the PC 201 during the process of transferring setting information.

The CPU 203 of the PC 201 executing the setup program stored in the ROM 204 or the external storage device 207, causes the display unit 210 to display the screens illustrated in FIGS. 3A to 3G. The setup program is a program that is started to set up the printer 251 or the printer 261, and is a program for making network settings and/or settings for performing printing such as the installation of a printer driver.

Figure 4:
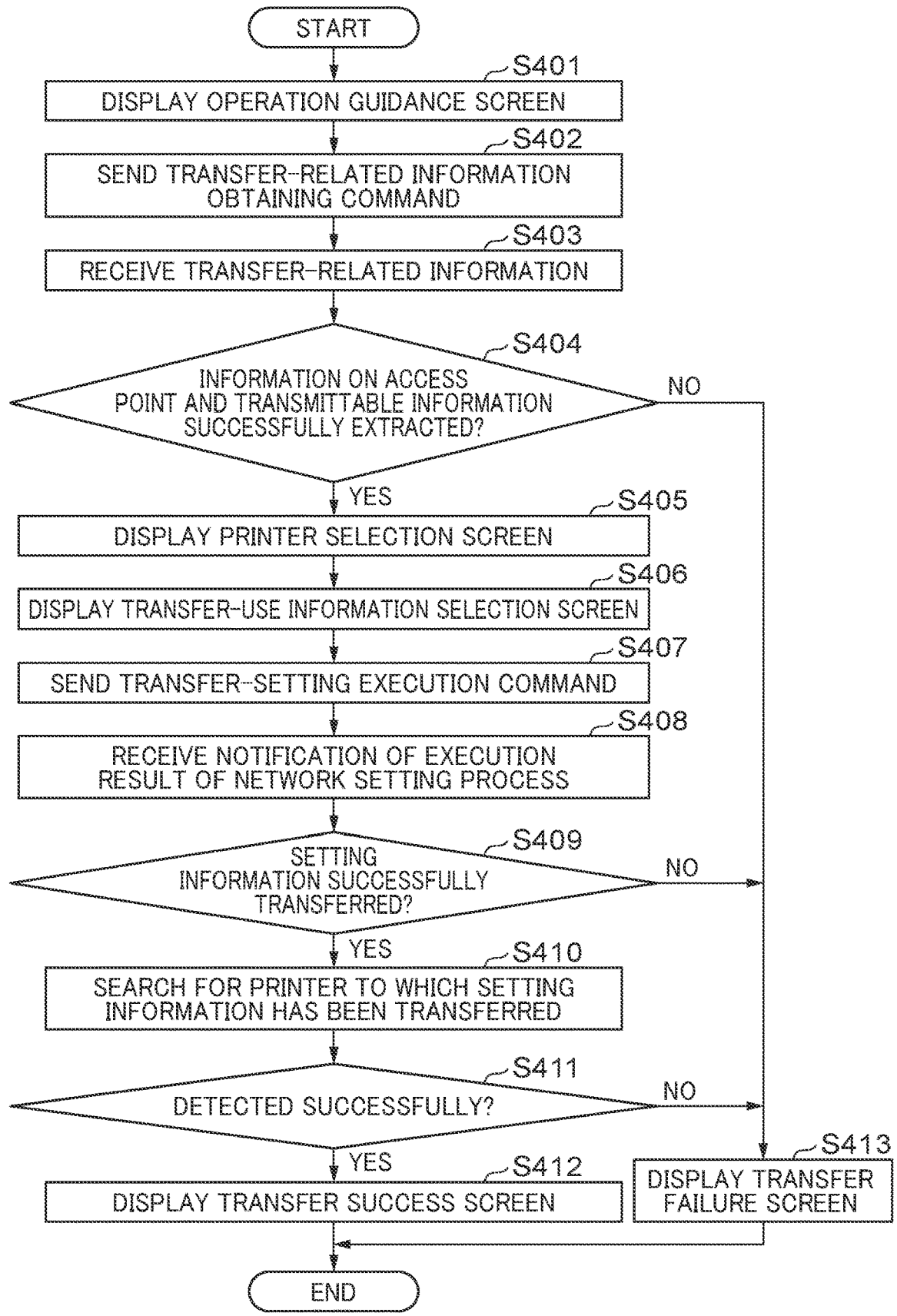
FIG. 4 is a flowchart illustrating the procedure of a transfer instruction process that is carried out by the PC in FIG. 1.

FIG. 4 is a flowchart illustrating the procedure of a transfer instruction process that is carried out by the PC 201 in FIG. 1. The transfer instruction process in FIG. 4 is implemented by the CPU 203 of the PC 201 loading a program such as the setup program stored in the ROM 204 or the external storage device 207 into the RAM 206 and executing the same. The transfer instruction process in FIG. 4 is carried out, for example, in response to the depression of an OK button 302 in a printer transfer guidance screen 301 by a user or in response to the start of the setup program on the PC 201.

Figure 3A:
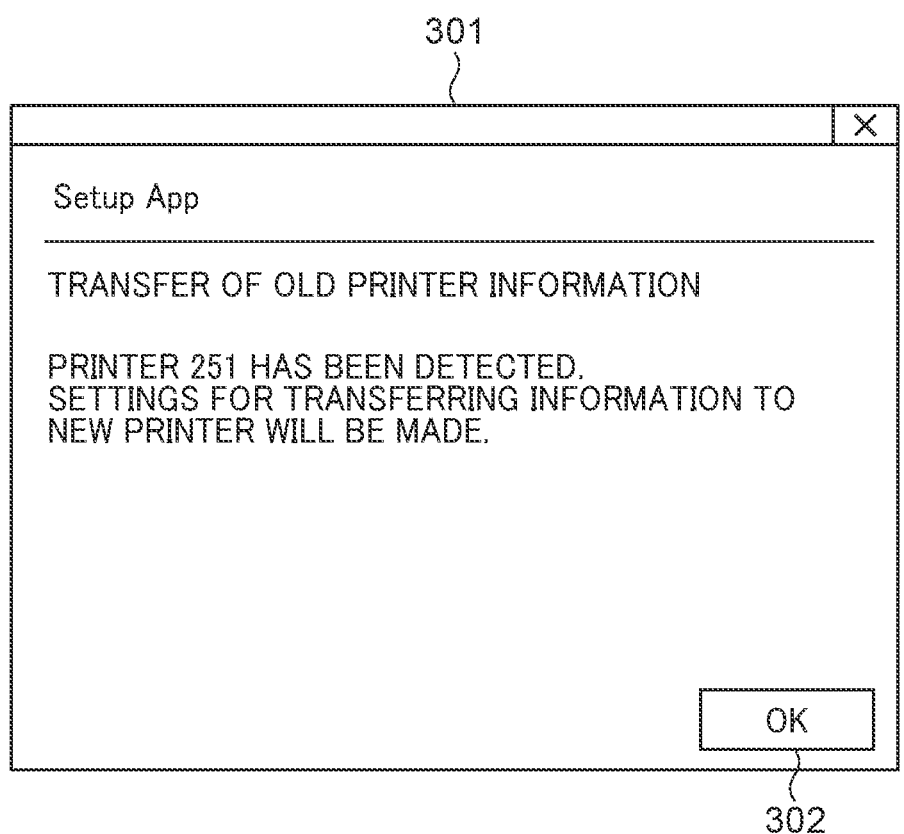
Figure 3B:
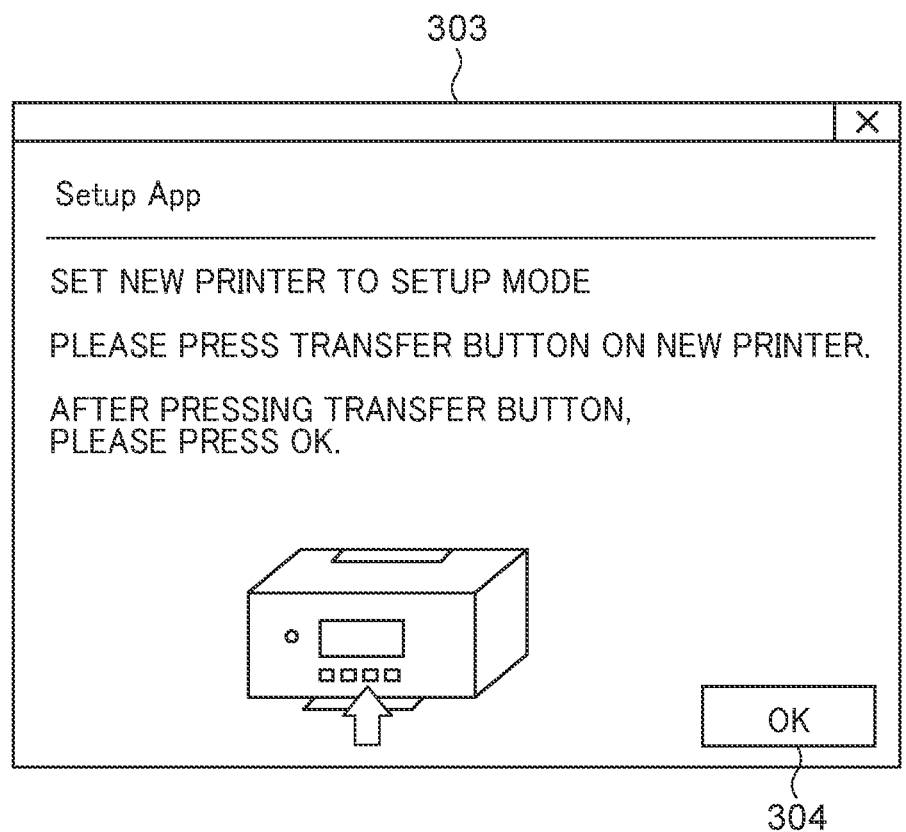
Figure 3C:
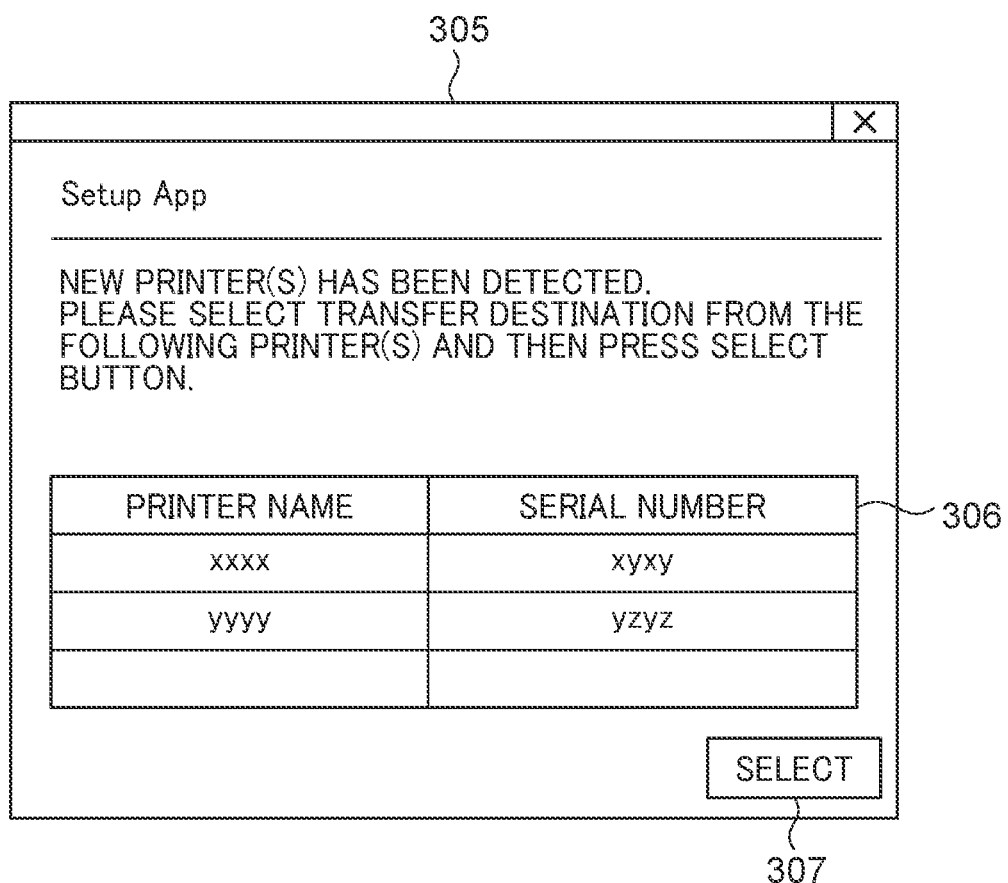
Figure 3E:
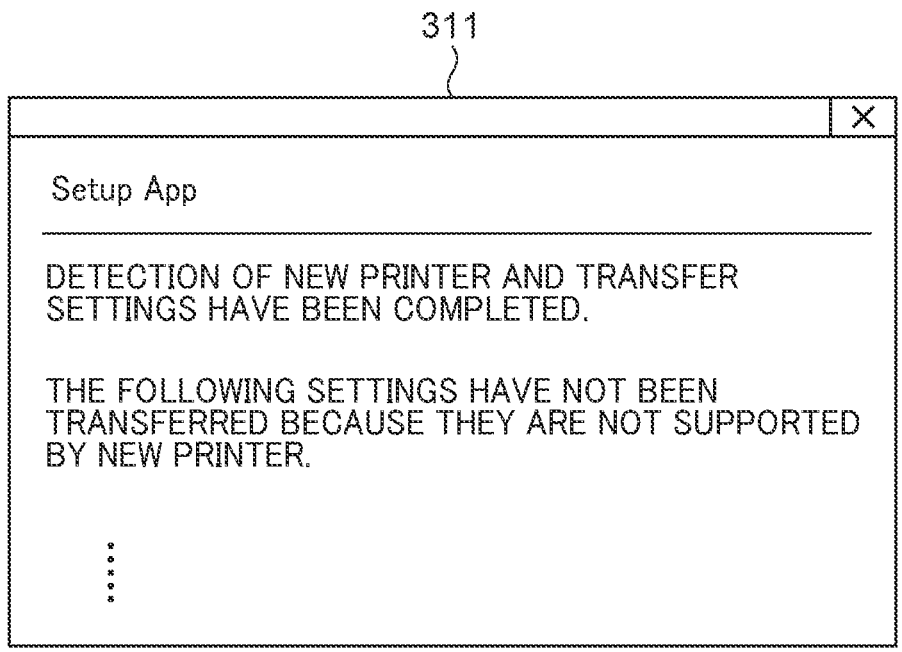
Figure 3F:
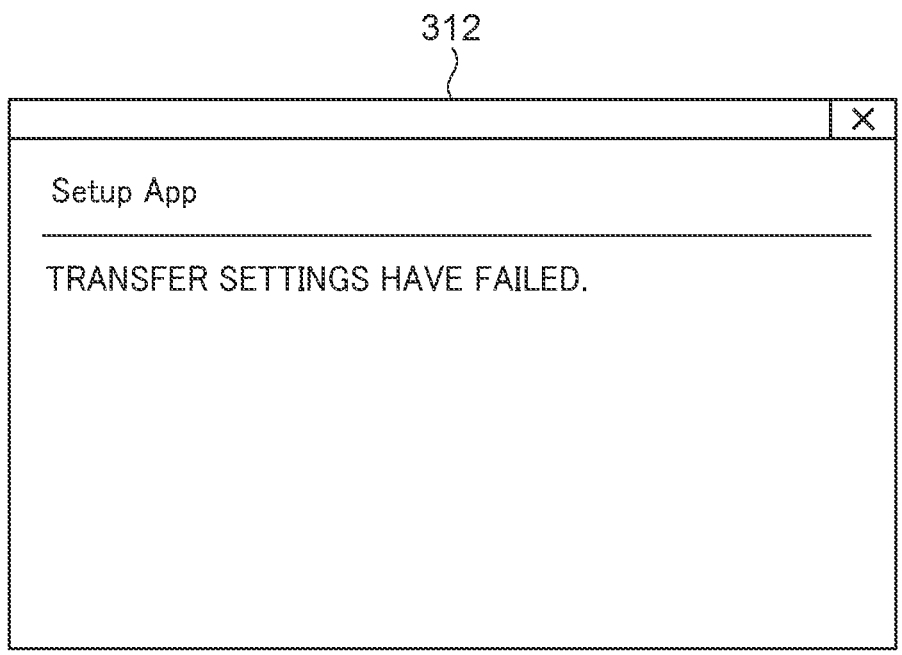
Figure 3G:
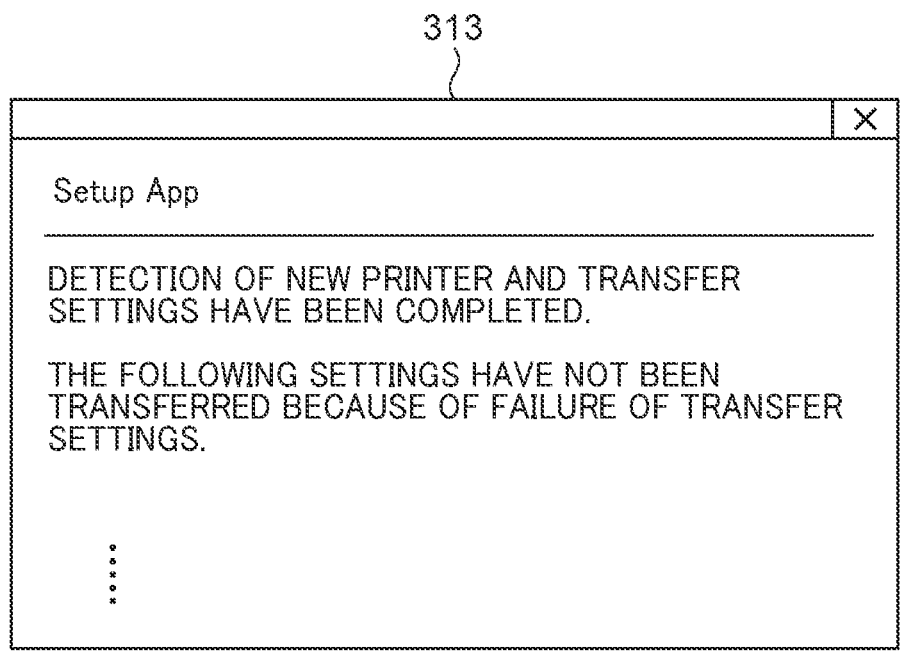

Referring to FIG. 4, first, the CPU 203 causes the display unit 210 to display an operation guidance screen 303 in FIG. 3B (step S401). The operation guidance screen 303 is a screen indicating the details of an operation for setting the printer 261, which is the data transfer destination, to a setup mode. When a user depresses a transfer button (which is not illustrated) on the printer 261 according to a guidance indicated in the operation guidance screen 303, the printer 261 enters the setup mode.

The setup mode is a mode for performing network setup of the printer 261 and is a mode in which the printer 261 can receive network setting information via wireless communication. When the printer 261 operates in the setup mode, it operates as a predetermined access point having a predetermined SSID determined in advance.

The predetermined SSID is an SSID that is set in advance and that users are not allowed to change. The predetermined SSID includes a serial number, a model name, and so forth. The predetermined access point is an access point that is used only when the printer 261 is in the setup mode. Examples of the predetermined access point include an access point that does not require a password and an access point that is accessible with a fixed password. The PC 201 and the printer 251 are wirelessly connectable to the predetermined access point.

When the PC 201 or the printer 251 wirelessly connects to the printer 261 in the setup mode, the PC 201 or the printer 251 becomes wirelessly communicable with the printer 261. The printer 261 in the setup mode is wirelessly communicable with the PC 201 or the printer 251 without the access point 101, but is not allowed to receive an instruction to perform printing. It should be noted that the printer 261 may enter the setup mode when the printer 261 is powered on for the first time.

When the printer 261 enters the setup mode in response to the depression of the transfer button by a user and then receives a depression of an OK button 304 in the operation guidance screen 303 by the user, the process proceeds to step S402.

In the step S402, the CPU 203 sends a transfer-related information obtainment command to the printer 251, which is the data transfer source. The printer 251 that has received the transfer-related information obtainment command carries out a transmission control process in FIG. 5.

Figure 5:
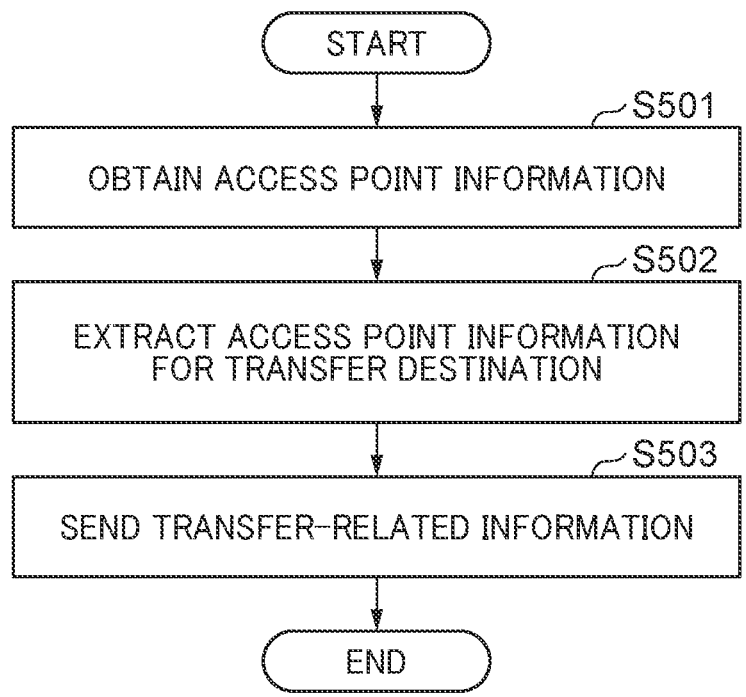
FIG. 5 is a flowchart illustrating the procedure of a transmission control process that is carried out by the printer in FIG. 1.

FIG. 5 is a flowchart illustrating the procedure of the transmission control process that is carried out by the printer 251 in FIG. 1. The transmission control process in FIG. 5 is implemented by the CPU 255 of the printer 251 loading a program stored in the ROM 254 into the RAM 253 and executing the same.

Referring to FIG. 5, the CPU 255 obtains information on access points placed around the printer 251 (step S501). In the step S501, for example, the CPU 255 obtains the information on the access points from beacon signals transmitted from the access points placed around the printer 251. Examples of the access points placed around the printer 251 include the printer 261 that has entered the setup mode and is operating as the predetermined access point. The information on the access points includes SSIDs and MAC addresses of the access points. The MAC addresses are identification numbers that are physically assigned to respective communication entities so that they can be uniquely identified on a communication network.

It should be noted that although in the above description of the present embodiment, upon receiving the transfer-related information obtainment command from the PC 201, the printer 251 obtains information on access points placed around the printer 251, the present invention is not limited to this. For example, before receiving the transfer-related information obtainment command from the PC 201, the printer 251 may obtain information on access points, which are placed around the printer 251, in advance. The obtained information on the access points is stored in the RAM 253 or another memory device.

Then, the CPU 255 extracts information on an access point that can be a data transfer destination from the obtained information on the access points (step S502). Specifically, the CPU 255 extracts information on the printer 261 that has entered the setup mode and is operating as the predetermined access point. Then, the CPU 255 sends transfer-related information including the information on the access point extracted in the step S502 and the transmittable information 259 on the printer 251 to the PC 201 (step S503), and then ends the transmission control process. It should be noted that although in the above description of the present embodiment, the printer 251 extracts information on an access point that can be a data transfer destination, the present invention is not limited to this. For example, the printer 251 may send information on all of the access points obtained in the step S501 to the PC 201, and then the PC 201 may extract information on an access point that can be a data transfer destination from the obtained information on the access points.

Referring again to FIG. 4, the CPU 203 of the PC 201 receives transfer-related information from the printer 251 that is the data transfer source (step S403). The CPU 203 carries out a process of extracting the information on the access point and the transmittable information 259 on the printer 251 from the received transfer-related information. The CPU 203 then determines whether or not the information on the access point and the transmittable information 259 on the printer 251 have been successfully extracted (step S404).

In a case where it is determined in the step S404 that the information on the access point and the transmittable information 259 on the printer 251 have not been successfully extracted, the process proceeds to step S413, which will be described later.

In a case where it is determined in the step S404 that the information on the access point and the transmittable information 259 on the printer 251 have been successfully extracted, the process proceeds to step S405. In the step S405, the CPU 203 causes the display unit 210 to display a printer selection screen 305 in FIG. 3C.

The printer selection screen 305 includes a printer selection area 306 and a selection button 307. The printer selection area 306 indicates information on at least one printer that can be a data transfer destination, based on the transfer-related information received in the step S403, examples of which include information on the model name, serial number, etc. of the printer 261 that has entered the setup mode and is operating as the predetermined access point. In a case where the transfer-related information received in the step S403 includes information on two or more access points, a user is allowed to select a desired printer as a data transfer destination from a plurality of candidates indicated in the printer selection screen 305. In this case, the printer selection screen 305 may include a cancel button.

When the user has selected the cancel button, the transfer instruction process is ended. On the other hand, when the user has selected a printer that is a data transfer destination from the plurality of candidates displayed in the printer selection area 306 and then selected the selection button 307, the process proceeds to step S406.

In a case where the transfer-related information received in the step S403 includes information on only one access point, the CPU 203 may cause the display unit 210 to omit displaying the printer selection screen 305. In this case, the CPU 203 determines that a printer corresponding to the information on the access point is a data transfer destination.

In the step S406, the CPU 203 causes the display unit 210 to display a transfer-use information selection screen 308 in FIG. 3D. The transfer-use information selection screen 308 includes a selection area 309 and a selection button 310. The selection area 309 indicates a list of setting information included in the transmittable information 259 extracted from the transfer-related information received in the step S403.

When the user has selected setting information to be transferred to the printer selected or determined as the data transfer destination (hereafter referred to as "the transfer-use setting information") from the setting information indicated in the selection area 309 and then selected the selection button 310, the process proceeds to step S407. In the present embodiment, all of the setting information included in the transmittable information 259 may be determined to be the transfer-use setting information by the CPU 203. In the case where the CPU 203 determines all of the setting information included in the transmittable information 259 as the transfer-use setting information, the step S406 is not executed, and the display unit 210 is caused to omit displaying the transfer-use information selection screen 308.

Figure 6:
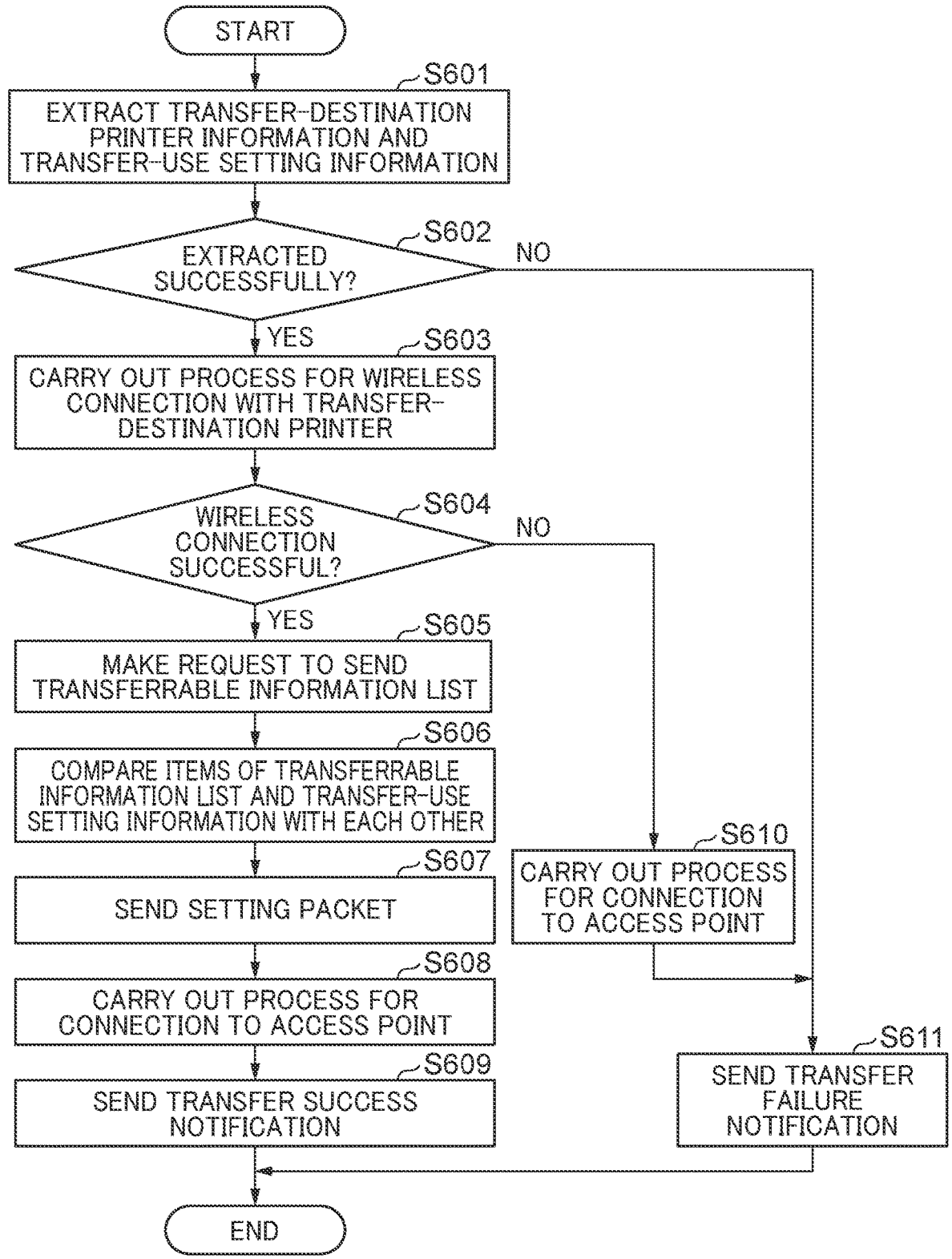
FIG. 6 is a flowchart illustrating the procedure of a network setting process that is carried out by the printer in FIG. 1.

In the step S407, the CPU 203 sends a transfer-setting execution command for causing the printer 251 to carry out a network setting process in FIG. 6 to the printer 251, which is the data transfer source. The transfer-setting execution command is instruction information indicating that setting information on communication between the PC 201 and the printer 261 is to be sent to the printer 261. The transfer-setting execution command includes information indicating the printer selected as the data transfer destination by the user (hereafter referred to as "the transfer-destination printer information") and the transfer-use setting information. The CPU 203 stands by until it receives a notification of the execution result of the network setting process from the printer 251.

FIG. 6 is a flowchart illustrating the procedure of the network setting process that is carried out by the printer 251 in FIG. 1. The network setting process in FIG. 6 is implemented by the CPU 255 of the printer 251 loading a program into the RAM 253 and executing the same.

Referring to FIG. 6, the CPU 255 carries out a process of extracting the transfer-destination printer information and the transfer-use setting information from the transfer-setting execution command received from the PC 201 (step S601). The CPU 255 then determines whether or not the transfer-destination printer information and the transfer-use setting information have been successfully extracted (step S602).

In a case where it is determined in the step S602 that the transfer-destination printer information and the transfer-use setting information have not been successfully extracted, the process proceeds to step S611. In a case where it is determined in the step S602 that the transfer-destination printer information and the transfer-use setting information have been successfully extracted, the process proceeds to step S603.

In the step S603, the CPU 255 carries out a process of wirelessly connecting to the printer selected or determined as the data transfer destination. Specifically, the CPU 255 records information on the access point 101, to which the printer 251 is now connected, in the RAM 253 and then temporarily disconnects from the access point 101. As a result, the connection of the printer 251 for wireless communication with the PC 201 is terminated. After disconnecting from the access point 101, the CPU 255 wirelessly connects to the printer 261 selected or determined as the data transfer destination. It should be noted that the connection between the printer 251 and the printer 261 is a direct connection established by the printer 261 operating in a P2P mode. The P2P mode is a mode in which a printer directly connects to another device such as the PC 201 without an external device that forms a network.

The CPU 255 then determines whether or not the wireless connection with the printer 261 is successful (step S604).

In a case where it is determined in the step S604 that the wireless connection with the printer 261 is successful, the process proceeds to step S605. In the step S605, the CPU 255 requests the printer 261 that is the data transfer destination, to send the transferrable information list 269. The printer 261 that has received this request sends the transferrable information list 269 to the printer 251.

The CPU 255 compares the items of the transferrable information list 269 received from the printer 261 and the transfer-use setting information extracted in the step S602 with each other (step S606). Based on the result of the comparison, the CPU 255 divides the transfer-use setting information into setting information transferrable to the printer 261 and setting information not transferrable to the printer 261 and records them in the RAM 253. It should be noted that the setting information transferrable to the printer 261 is setting information that can be set for (in other words, is supported by) the printer 261 and includes network setting information relating to connection between the PC 201 and the printer 261, setting information for use in a printing process, and account setting information. The setting information not transferrable to the printer 261 is setting information that cannot be set for the printer 261. The CPU 255 then generates a setting packet. The setting packet includes, for example, the setting information transferrable to the printer 261 and network setting information (an SSID, a password) used for connecting to the access point 101 that was wirelessly connected to the printer 251.

Then, the CPU 255 sends the generated setting packet to the printer 261 using SNMP (Simple Network Management Protocol) (step S607). SNMP is a protocol for monitoring and controlling devices (including a printer) on a network to which communication equipment belongs. By carrying out communications using SNMP, the printer 251 is able to obtain and configure information on a database called MIB (Management Information Base) of a device to be monitored and controlled.

Based on the setting packet received from the printer 251, the printer 261 identifies the access point 101 that was wirelessly connected to the printer 251 and searches for the identified access point 101. The printer 261 then uses the password included in the setting packet to send a connection request to the detected access point 101. The access point 101 that has received the connection request wirelessly connects to the printer 261. After that, the printer 261 carries out a process of applying setting information other than the network setting information included in the setting packet to setting information for itself. After completing this process, an infrastructure connection is established between the printer 261 and the PC 201 to complete the configuration of the setting information in the printer 261.

It should be noted that the printer 251 may obtain from the PC 201 network setting information set for the PC 201, and in a case where the obtained network setting information matches network setting information set for the printer 251 itself, the printer 251 may send the obtained network setting information to the printer 261. This prevents network setting information different from the network setting information on an access point that was wirelessly connected to the PC 201 from being sent to the printer 261 by mistake.

After the configuration of the setting information in the printer 261 is completed, the CPU 255 carries out a process of connecting to the access point 101 from which it disconnected in the step S603 (step S608). This makes the printer 251 wirelessly communicable with the PC 201 via the access point 101.

Then, the CPU 255 sends a transfer success notification to the PC 201 via wireless communication (step S609). The transfer success notification includes information indicating that the setting information has been successfully transferred to the printer 261. The transfer success notification also includes setting information that failed to be transferred to the printer 261. After that, the CPU 255 ends the network setting process.

In a case where it is determined in the step S604 that the wireless connection with the printer 261 is not successful, the process proceeds to step S610. In the step S610, the CPU 255 carries out a process of connecting to the access point 101 from which it disconnected in the step S603. This makes the printer 251 wirelessly communicable with the PC 201 via the access point 101.

Then, the CPU 255 sends a transfer failure notification to the PC 201 via wireless communication (step S611). The transfer failure notification includes information indicating that the setting information has not been successfully transferred to the printer 261. After that, the CPU 255 ends the network setting process.

Referring again to FIG. 4, the CPU 203 of the PC 201 receives a notification of the execution result of the network setting process from the printer 251 (step S408). This notification is the transfer success notification sent from the printer 251 in the step S609 or the transfer failure notification sent from the printer 251 in the step S611. Then, based on the received notification, the CPU 203 determines whether or not the setting information has been successfully transferred to the printer 261 (step S409).

In a case where it is determined in the step S409 that the setting information has not been successfully transferred to the printer 261, the process proceeds to the step S413, which will be described later. In a case where it is determined in the step S409 that the setting information has been successfully transferred to the printer 261, the process proceeds to step S410.

In the step S410, the CPU 203 searches for the printer 261 to which the setting information has been transferred. There is a possibility that it will take time for the printer 261 to wirelessly connect to the access point 101, and hence in the step S410, a time limit may be set, and the CPU 203 may perform the search a plurality of times within the time limit. The CPU 203 then determines whether or not the printer 261 has been successfully detected in the step S410 (step S411).

In a case where it is determined in the step S411 that the printer 261 has been successfully detected, the process proceeds to step S412. In the step S412, the CPU 203 causes the display unit 210 to display a transfer success screen 311 in FIG. 3E, which indicates that the transfer of the setting information has been completed. The transfer success screen 311 includes a message indicating that the transfer of the setting information to the printer 261 is successful. The transfer success screen 311 also indicates the setting information that failed to be transferred to the printer 261. It should be noted that the transfer success screen 311 may indicate no setting information that failed to be transferred to the printer 261. After that, the transfer instruction process is ended.

In a case where it is determined in the step S411 that the printer 261 has not been successfully detected, the process proceeds to the step S413. In the step S413, the CPU 203 causes the display unit 210 to display a transfer failure screen 312 in FIG. 3F, which indicates that the transfer of the setting information failed. After that, the transfer instruction process is ended.

According to the embodiment described above, the printer 251, which is the data transfer source, searches for a data transfer destination according to an instruction from the PC 201. The printer 251 then terminates a connection for wireless communication with the PC 201 and establishes a wireless connection with the printer 261, which is the data transfer destination. To the printer 261, the printer 251 sends the network setting information relating to communication between the PC 201 and the printer 261 among the plurality of pieces of setting information held by the printer 251. With this configuration, even if the PC 201 is not wirelessly connectable to the printer 261, which is the data transfer destination, the printer 251 can send the network setting information to the printer 261. That is, the network setting information set in the printer 251, which is the data transfer source, can be transferred to the printer 261, which is the data transfer destination. As a result, the PC 201 and the printer 261 become communicable with each other.

Moreover, in the embodiment described above, to the printer 261 that is the data transfer destination, the printer 251 that is the data transfer source further sends the transfer-use setting information different from the network setting information among a plurality of pieces of setting information held by the printer 251. Thus, the transfer-use setting information as well as the network setting information can be transferred to the printer 261 that is the data transfer destination.

Furthermore, in the embodiment described above, the transfer-use setting information is setting information that is selected by a user from the plurality of pieces of setting information held in a storage device such as the RAM 251 of the printer 251. Thus, the setting information selected by the user (e.g., non-network setting information) can be transferred to the printer 261 that is the data transfer destination.

Additionally, in the embodiment described above, the transfer-use setting information is setting information that is supported by the printer 261 that is the data transfer destination, among the plurality of pieces of setting information held in a storage device such as the RAM 251 of the printer 251. Thus, the setting information that is held by the printer 251 and supported by the printer 261 that is the data transfer destination can be transferred to the printer 261.

In the embodiment described above, for example, the PC 201 may wirelessly communicate with the printer 251 via the access point 101 connected to the PC 201 via a wired LAN. In this case, the PC 201 is an apparatus that has no wireless communication function and cannot wirelessly communicate with the printer 251 or the printer 261 without the access point 101 to which the PC 201 is connected via the wired LAN. With this configuration, network setting information for connecting to the access point 101 can be easily transferred from the printer 251 to the printer 261 that is the transfer destination.

Moreover, in the embodiment described above, the PC 201 may wirelessly communicate with the printer 251 via the access point 101 connected to the PC 201 via a wireless LAN. That is, the PC 201 is an apparatus that has a wireless communication function. With this configuration, even if the printer 261, which is the transfer destination, is too far from the PC 201 to wirelessly communicate with the PC 201, the network setting information can be transferred from the printer 251 to the printer 261.

In the embodiment described above, the printer 251 and the printer 261 are apparatuses that carry out a printing process in which an image is printed on a printing medium. Thus, when an existing printer is replaced with a new printer in the communication system 100, the network setting information set in the existing printer can be transferred to the new printer.

Moreover, in the embodiment described above, the transfer-use setting information is setting information that is used in a printing process. Thus, when an existing printer is replaced with a new printer in the communication system 100, the print setting information held by the existing printer can be transferred to the new printer.

It should be noted that in the present embodiment, after the transfer instruction process is completed, the CPU 203 may send a command for turning off the printer 251, which is the data transfer source, with the consent of a user. As a result, the printer 251 is shut down, and when printing is performed, it prevents use of the printer 251, which is the data transfer source, for the printing instead of the printer 261 to which the setting information has been transferred.

A description will now be given of a communication system according to a second embodiment of the present invention.

The first embodiment described above presents an example that the selection area 309 in the transfer-use information selection screen 308 indicates the list of setting information included in the transmittable information 259 on the printer 251. However, this list may further include setting information that is not supported by the printer 261, and there is a concern that a user may select the setting information that is not supported by the printer 261 on the transfer-use information selection screen 308. Accordingly, in the second embodiment described below, the communication system 100 is configured to allow a user to select only setting information that is supported by the printer 261, which is the data transfer destination, on the transfer-use information selection screen 308. It should be noted that in the second embodiment, the same communication system 100 as in the first embodiment described above is used, and elements have the same configurations as in the first embodiment described above unless otherwise noted.

Figure 7:
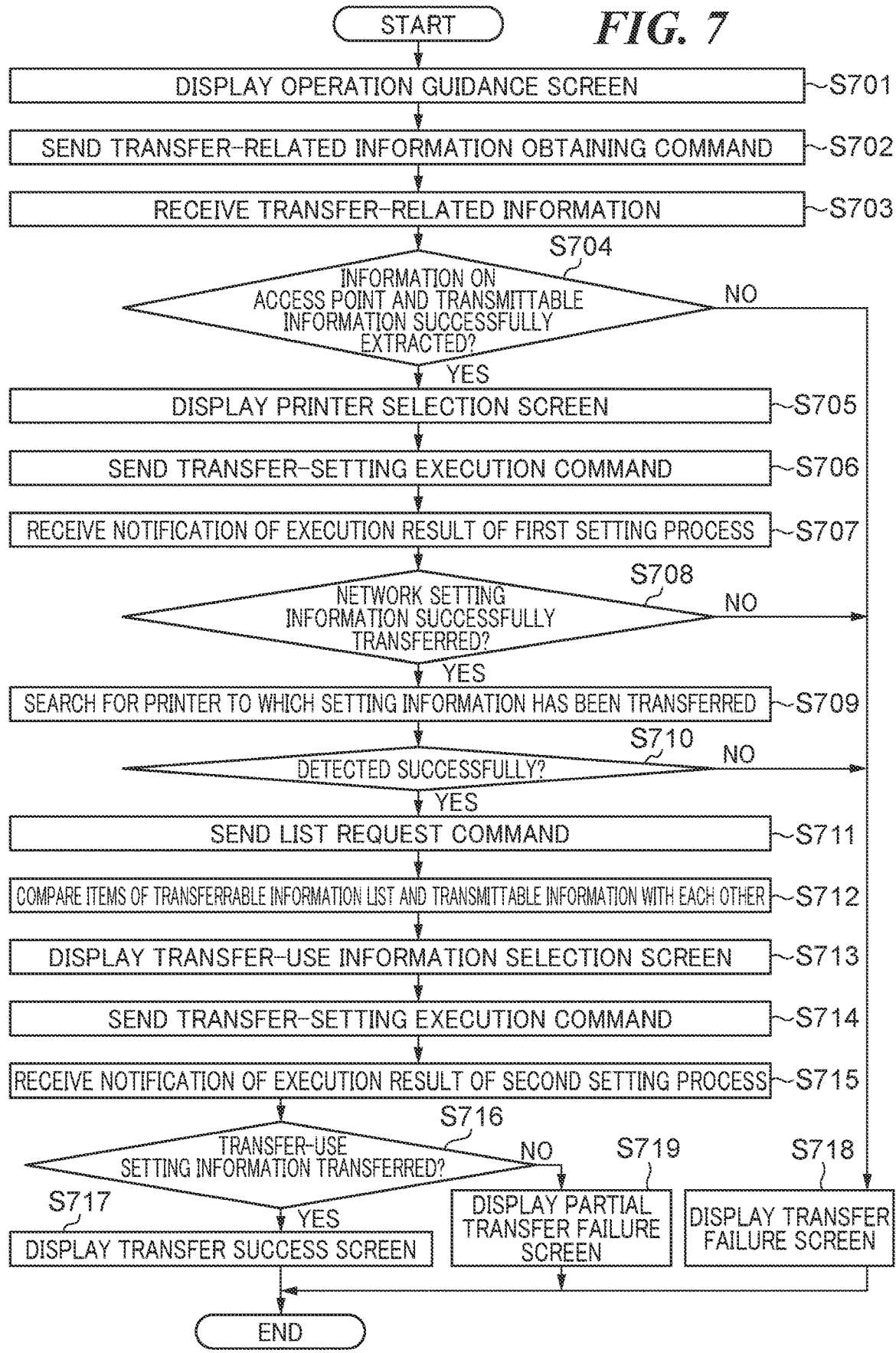
FIG. 7 is a flowchart illustrating the procedure of a transfer instruction process that is carried out by a PC according to a second embodiment.

FIG. 7 is a flowchart illustrating the procedure of a transfer instruction process that is carried out by the PC 201 in the second embodiment. It should be noted that the transfer instruction process in FIG. 7 is similar to the transfer instruction process in FIG. 4 described above, and features different from those of the transfer instruction process in FIG. 4 will be described below.

The transfer instruction process in FIG. 7 is implemented by the CPU 203 of the PC 201 loading a program such as the setup program stored in the ROM 204 or the external storage device 207 into the RAM 206 and executing the same, similarly to the transfer instruction process in FIG. 4. The transfer instruction process in FIG. 7 is carried out, for example, in response to the depression of the OK button 302 in the printer transfer guidance screen 301 by a user or in response to the start of the setup program on the PC 201, similarly to the transfer instruction process in FIG. 4.

Referring to FIG. 7, steps S701 to S704 which are the same processes as the steps S401 to S404 are executed. In a case where it is determined in the step S704 that the information on the access point and the transmittable information 259 on the printer 251 have not been successfully extracted, the process proceeds to step S718, which will be described later. In a case where it is determined in the step S704 that the information on the access point and the transmittable information 259 on the printer 251 have been successfully extracted, the process proceeds to step S705. In the step S705, the CPU 203 causes the display unit 210 to display the printer selection screen 305 as with the step S405.

Figure 8:
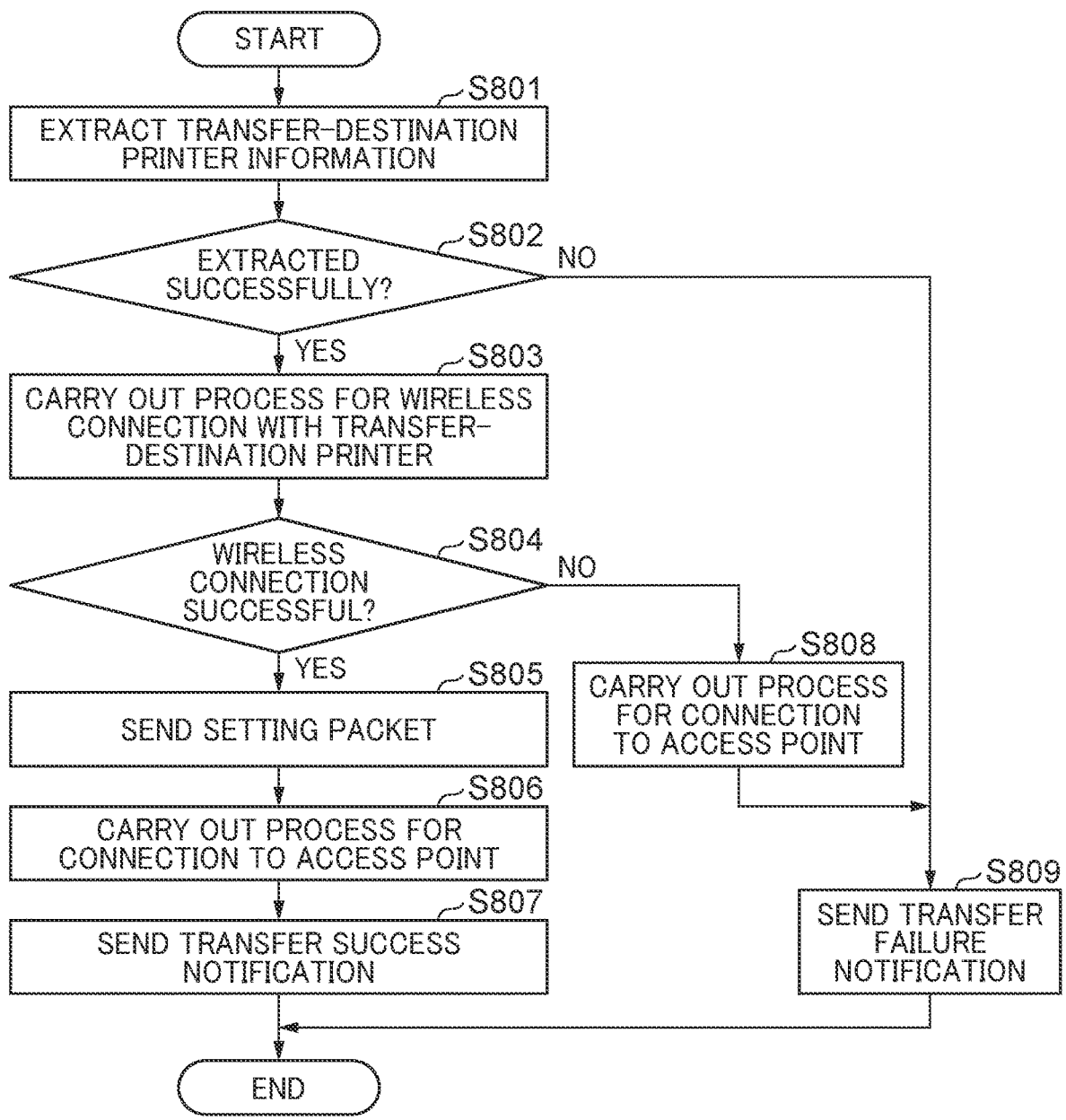
FIG. 8 is a flowchart illustrating the procedure of a first setting process that is carried out by a printer according to the second embodiment.

The CPU 203 then sends a transfer-setting execution command for causing the printer 251, which is the data transfer source, to carry out a first setting process in FIG. 8 to the printer 251 (step S706). The transfer-setting execution command includes information indicating the printer 261 selected as the data transfer destination on the printer selection screen 305 by a user. Thus, in the transfer instruction process in FIG. 7, the transfer-setting execution command sent to the printer 251 in the step S706 does not include the transfer-use setting information as distinct from the transfer instruction process in FIG. 4. The CPU 203 stands by until it receives a notification of the execution result of the first setting process from the printer 251.

FIG. 8 is a flowchart illustrating the procedure of the first setting process that is carried out by the printer 251 in the second embodiment. The first setting process is a process for transferring network setting information set in the printer 251 to the printer 261. It should be noted that the first setting process in FIG. 8 is similar to the network setting process in FIG. 6 described above, and features different from those of the network setting process in FIG. 6 described above will be specifically described below.

The first setting process in FIG. 8 is implemented by the CPU 255 of the printer 251 loading a program stored in the ROM 254 into the RAM 253 and executing the same as with the network setting process in FIG. 6 described above.

Referring to FIG. 8, the CPU 255 carries out a process of extracting the transfer-destination printer information from the transfer-setting execution command received from the PC 201 (step S801). The CPU 255 then determines whether or not the transfer-destination printer information has been successfully extracted (step S802).

In a case where it is determined in the step S802 that the transfer-destination printer information has not been successfully extracted, the process proceeds to step S809. In a case where it is determined in the step S802 that the transfer-destination printer information has been successfully extracted, the process proceeds to step S803.

In the step S803, the CPU 255 carries out a process of wirelessly connecting to the printer 261, which is the transfer destination, as with the step S603 described above. The CPU 255 then determines whether or not the wireless connection with the printer 261 is successful as with the step S604 described above (step S804).

In a case where it is determined in the step S804 that the wireless connection with the printer 261 is successful, the process proceeds to step S805. In the step S805, the CPU 255 sends a setting packet to the printer 261 using SNMP. The setting packet includes network setting information (an SSID, a password) for connecting to the access point 101 that was wirelessly connected to the printer 251. By carrying out communications using SNMP, the printer 251 is able to obtain information on the printer 261 and configure settings for the printer 261.

Based on the setting packet received from the printer 251, the printer 261 identifies the access point 101 that was connected to the printer 251 and searches for the identified access point 101. The printer 261 then sends a connection request using the password included in the setting packet to the detected access point 101. The access point 101 that has received the connection request wirelessly connects to the printer 261.

It should be noted that in the first setting process, as distinct from the network setting process in FIG. 6, the printer 261 does not carry out the process of applying setting information other than the network setting information in the setting packet to setting information for itself when the wireless connection between the printer 261 and the access point 101 is completed. After the wireless connection with the access point 101 is completed, an infrastructure connection is established between the printer 261 and the PC 201 to complete the configuration of the network setting information in the printer 261.

After the configuration of the network setting information in the printer 261 is completed, the CPU 255 carries out a process of connecting to the access point 101 from which it disconnected in the step S803 (step S806). This makes the printer 251 wirelessly communicable with the PC 201 via the access point 101.

Then, the CPU 255 sends a transfer success notification to the PC 201 (step S807). The transfer success notification includes information indicating that the network setting information has been successfully transferred to the printer 261. After that, the first setting process is ended.

In a case where it is determined in the step S804 that the wireless connection with the printer 261 is unsuccessful, the CPU 255 carries out a process of connecting to the access point 101 from which it disconnected in the step S803 (step S808). This makes the printer 251 wirelessly communicable with the PC 201 via the access point 101.

Then, the CPU 255 sends a transfer failure notification to the PC 201 (step S809). The transfer failure notification includes information indicating that the network setting information has not been successfully transferred to the printer 261. After that, the first setting process is ended.

Referring again to FIG. 7, the CPU 203 of the PC 201 receives a notification of the execution result of the first setting process from the printer 251 (step S707). This notification is the transfer success notification or the transfer failure notification. Then, based on the received notification, the CPU 203 determines whether or not the network setting information has been successfully transferred to the printer 261 (step S708).

In a case where it is determined in the step S708 that the network setting information has not been successfully transferred to the printer 261, the process proceeds to the step S718, which will be described later. In a case where it is determined in the step S708 that the network setting information has been successfully transferred to the printer 261, the process proceeds to step S709.

In the step S709, the CPU 203 searches for the printer 261 to which the network the setting information has been transferred from the printer 251 (step S709). It should be noted that as with the step S410 described above, a time limit may be set, and the CPU 203 may perform the search a plurality of times within the time limit.

The CPU 203 then determines whether or not the printer 261 has been successfully detected in the step S709 (step S710).

In a case where it is determined in the step S710 that the printer 261 has not been successfully detected, the process proceeds to step S718. In the step S718, the CPU 203 causes the display unit 210 to display the transfer failure screen 312 as with the step S413 described above. After that, the transfer instruction process is ended.

In a case where it is determined in the step S710 that the printer 261 has been successfully detected, the process proceeds to step S711. In the step S711, the CPU 203 sends a request command, which requests the transmission of the transferrable information list 269, to the printer 261. The printer 261 that has received this request command sends the transferrable information list 269 to the PC 201. It should be noted that since the printer 261 has successfully made the wireless connection with the access point 101, the PC 201, the printer 251, and the printer 261 are devices residing on the same network and become communicable with one another.

The CPU 203 of the PC 201 compares the items of the transferrable information list 269 received from the printer 261 and the transmittable information 259 on the printer 251 included in the transfer-related information received in the step S703 with each other (step S712). Based on the result of the comparison, the CPU 203 records the matching setting information as transfer candidate information in the RAM 206.

Then, the CPU 203 causes the display unit 210 to display the transfer-use information selection screen 308 (step S713). The selection area 309 of the transfer-use information selection screen 308 indicates the transfer candidate information stored in the RAM 206. Thus, in the second embodiment, the selection area 309 of the transfer-use information selection screen 308 indicates only setting information that is setting information other than the network setting information and is supported by the printer 261. It allows a user to select only setting information supported by the printer 261, on the transfer-use information selection screen 308. When the user has selected transfer-use setting information from the setting information in the selection area 309 and then depressed the selection button 310, the process proceeds to step S714.

In the step S714, the CPU 203 sends a transfer-setting execution command for causing the printer 251 to carry out a second setting process in FIG. 9 to the printer 251. The transfer-setting execution command includes the transfer-destination printer information indicating the printer 261 selected as the transfer destination on the printer selection screen 305 by the user and the transfer-use setting information selected on the transfer-use information selection screen 308 by the user. The CPU 203 stands by until it receives a notification of the execution result of the second setting process from the printer 251.

FIG. 9 is a flowchart illustrating the procedure of the second setting process that is carried out by the printer 251 in the second embodiment. The second setting process is a process for transferring the transfer-use setting information to the printer 261. It should be noted that the second setting process in FIG. 9 is similar to the network setting process in FIG. 6 described above, and features different from those of the network setting process in FIG. 6 described above will be specifically described below.

The second setting process in FIG. 9 is implemented by the CPU 255 of the printer 251 loading a program stored in the ROM 254 into the RAM 253 and executing the same, similarly to the network setting process in FIG. 6 described above.

Referring to FIG. 9, steps S901 and S902 which are the same processes as the steps S601 to S602 described above are executed.

In a case where it is determined in the step S902 that the transfer-destination printer information and the transfer-use setting information have not been successfully extracted, the process proceeds to step S907, which will be described later. In a case where it is determined in the step S902 that the transfer-destination printer information and the transfer-use setting information have been successfully extracted, the process proceeds to step S903.

In the step S903, based on the transfer-destination printer information extracted in the step S901, the CPU 255 searches for the printer 261 which is the transfer destination. The CPU 255 then determines whether or not the printer 261 has been successfully detected in the step S903 (step S904).

In a case where it is determined in the step S904 that the printer 261 has been successfully detected, the CPU 255 generates a setting packet including the transfer-use setting information. In a case where the transfer-use setting information includes, for example, print setting information, the setting packet includes the print setting information on the printer 251. Then, the CPU 255 sends the setting packet to the printer 261 using SNMP (step S905). The printer 261 carries out a process of applying the setting information included in the received setting packet to the setting information for itself.

Then, the CPU 255 sends a transfer success notification to the PC 201 (step S906). The transfer success notification includes information indicating that the transfer-use setting information has been successfully transferred to the printer 261. After that, the second setting process is ended.

In a case where it is determined in the step S904 that the printer 261 has not been successfully detected, the CPU 255 sends a transfer failure notification to the PC 201 (step S907). The transfer failure notification includes information indicating that the transfer-use setting information has not been successfully transferred to the printer 261. After that, the second setting process is ended.

It should be noted that the PC 201 may carry out a process corresponding to the second setting process in FIG. 9. Specifically, the CPU 203 of the PC 201 may obtain transfer-use setting information from a plurality of pieces of setting information stored in the ROM 254 or another storage device of the printer 251. The CPU 203 may send the obtained transfer-use setting information to the printer 261. It should be noted that SNMP is used to obtain information on the printer 251 and send information to the printer 261.

Referring again to FIG. 7, the CPU 203 of the PC 201 receives a notification of the execution result of the second setting process from the printer 251 (step S715). This notification is the transfer success notification sent in the step S906 described above or the transfer failure notification sent in the step S907 described above.

Then, based on the received notification, the CPU 203 determines whether or not the transfer-use setting information has been successfully transferred to the printer 261 (step S716).

In a case where it is determined in the step S716 that the transfer-use setting information has been successfully transferred to the printer 261, the process proceeds to step S717. In the step S717, the CPU 203 causes the display unit 210 to display the transfer success screen 311. It should be noted that in the second embodiment, a user is allowed to select the transfer-use setting information from a plurality of pieces of setting information that is supported by the printer 261 as described above. For this reason, as distinct from the first embodiment described above, the transfer success screen 311 does not indicate setting information that failed to be transferred to the printer 261. After that, the CPU 203 ends the transfer instruction process.

In a case where it is determined in the step S716 that the transfer-use setting information has not been successfully transferred to the printer 261, the process proceeds to step S719. In the step S719, the CPU 203 causes the display unit 210 to display a partial transfer failure screen 313 in FIG. 3G. The partial transfer failure screen 313 includes a message indicating that the network setting information has been successfully transferred to the printer 261. The partial transfer failure screen 313 further includes a message indicating that the transfer-use setting information has not been successfully transferred to the printer 261. After that, the CPU 203 ends the transfer instruction process.

As described above, the transfer-use setting information is sent to the printer 261 at a predetermined time after the printer 261, which is the data transfer destination, joins the same network as the PC 201 and the printer 251 using the network setting information. Thus, with the configuration in which the display unit 210 of the PC 201 is caused to display the transfer-use information selection screen 308, the PC 201 is able to obtain setting information that is supported by the printer 261 from the printer 261 through wireless communication via the access point 101 without requiring a user to perform any special operation on the printer 261. It allows a user to select the transfer-use setting information from the setting information that is supported by the printer 261.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2022-169993 filed on Oct. 24, 2022, which is hereby incorporated by reference herein in its entirety.

What is claimed is:

1. A communication apparatus communicable with an information processing apparatus, the communication apparatus comprising:
   a memory storing instructions; and
   at least one processor that executes the instructions to:
   execute a searching process of searching for at least one communication apparatus operating in a predetermined mode for receiving setting information;
   in a case where another communication apparatus is found by the searching process, send, to the information processing apparatus, predetermined information corresponding to finding of the another communication apparatus by the searching process;
   receive instruction information sent from the information processing apparatus on a basis of sending the predetermined information to the information processing apparatus;
   in a case where the instruction information is received from the information processing apparatus, establish without an external access point a direct connection for direct communication with the another communication apparatus; and
   use the direct communication to send, to the another communication apparatus, the setting information that is information used for connection with an access point to which the communication apparatus is connected before the direct connection is established and information relating to communication with the another communication apparatus, wherein the setting information includes an SSID, Service Set Identifier, that is used for connecting to the access point to which the communication apparatus is connected before the direct connection is established.

2. The communication apparatus according to claim 1, wherein the setting information includes network setting information relating to the communication between the information processing apparatus and the another communication apparatus.

3. The communication apparatus according to claim 2, wherein the at least one processor executes the instructions to, based on the received instruction information, send non-network setting information different from the network setting information to the another communication apparatus.

4. The communication apparatus according to claim 3, further comprising a storage device,
wherein the non-network setting information is setting information selected by a user from a plurality of pieces of setting information stored in the storage device.

5. The communication apparatus according to claim 3, further comprising a storage device,
wherein the non-network setting information is setting information selected by a user from a plurality of pieces of setting information that is stored in the storage device and is supported by the another communication apparatus.

6. The communication apparatus according to claim 3, further comprising a storage device,
wherein the non-network setting information is setting information that is supported by the another communication apparatus among a plurality of pieces of setting information stored in the storage device.

7. The communication apparatus according to claim 3, wherein the at least one processor executes the instructions to send the non-network setting information to the another communication apparatus at a predetermined time after the another communication apparatus uses the network setting information to join a same network as the information processing apparatus and the communication apparatus.

8. The communication apparatus according to claim 1, wherein the at least one processor executes the instructions to wirelessly communicate with the information processing apparatus via a wireless relay device connected to the information processing apparatus by a wired LAN.

9. The communication apparatus according to claim 1, wherein the at least one processor executes the instructions to wirelessly communicate with the information processing apparatus via a wireless relay device connected to the information processing apparatus by a wireless LAN.

10. The communication apparatus according to claim 1, wherein the communication apparatus and the another communication apparatus are printers.

11. The communication apparatus according to claim 3, wherein the non-network setting information is setting information that is used in a printing process in which an image is printed on a printing medium.

12. The communication apparatus according to claim 2, wherein the at least one processor executes the instructions to send the network setting information to the another communication apparatus in a case where the network setting information matches network setting information set in the information processing apparatus.

13. A control method for controlling a communication apparatus communicable with an information processing apparatus, the control method comprising:
executing a searching process of searching for at least one communication apparatus operating in a predetermined mode for receiving setting information;
in a case where another communication apparatus is found by the searching process, sending, to the information processing apparatus, predetermined information corresponding to finding of the another communication apparatus by the searching process;
receiving instruction information sent from the information processing apparatus on a basis of sending of the predetermined information to the information processing apparatus;
in a case where the instruction information is received from the information processing apparatus, establishing without an external access point a direct connection for direct communication to with the another communication apparatus; and
using the direction communication to send, to the another communication apparatus, setting information that is information used for connection with an access point to which the communication apparatus is connected before the direct connection is established and information relating to communication with the another communication apparatus, wherein the setting information includes an SSID, Service Set Identifier, that is used for connecting to the access point to which the communication apparatus is connected before the direct connection is established.

14. A system comprising:
a first memory storing instructions:
an information processing apparatus comprising at least one first processor;
a first communication apparatus communicable with the information processing apparatus and comprising a second memory storing instructions and at least one second processor; and
a second communication apparatus different from the first communication apparatus, the second communication apparatus being communicable with the first communication apparatus,
wherein the at least one second processor
executes a searching process of searching for at least one communication apparatus operating in a predetermined mode for receiving setting information, and
in a case where the second communication apparatus is found by the searching process, sends, to the information processing apparatus, predetermined information corresponding to finding of the second communication apparatus by the searching process,
the at least one first processor sends instruction information to the first communication apparatus on a basis of sending of the predetermined information to the information processing apparatus,
the at least one second processor
receives the instruction information sent t from the information processing apparatus on a basis of sending of the predetermined information to the information processing apparatus,
in a case where the instruction information is received from the information processing apparatus, establishes without an external access point a direct connection for direct communication to the second communication apparatus; and,
uses the direct communication to send, to the second communication apparatus, the setting information that is information used for connection with an access point to which the first communication apparatus is connected before the direct connection is established and information relating to communication with the second communication apparatus, wherein the setting information includes an SSID, Service Set Identifier, that is used for connecting to the access point to which the first communication apparatus is connected before the direct connection is established.

15. The system according to claim 14, wherein the setting information includes network setting information relating to the communication between the information processing apparatus and the second communication apparatus, and the information processing apparatus is configured to shut down the first communication apparatus after a process in which the first communication apparatus sends the network setting information to the second communication apparatus is completed.

16. The system according to claim 14, wherein the information processing apparatus is wirelessly communicable with the first communication apparatus via a wireless relay device connected to the information processing apparatus by a wired LAN.

17. The system according to claim 14, wherein the information processing apparatus is wirelessly communicable with the first communication apparatus via a wireless relay device connected to the information processing apparatus by a wireless LAN.

18. The communication apparatus according to claim 1,
wherein the setting information includes print setting information that is used in a printing process, and
wherein the at least one processor executes the instructions to send, to the another communication apparatus, the setting information selected by a user through the information processing apparatus.

19. The communication apparatus according to claim 1, wherein the at least one processor executes the instructions to,
in a case where the instruction information is received from the information processing apparatus, terminate a connection to an external access point used for communication with the information processing apparatus and establish the connection for direct communication to the another communication apparatus, and
in a case where the setting information is sent to the another communication apparatus, reestablish a connection to the external access point.

* * * * *